(12) United States Patent
Luh

(10) Patent No.: US 6,378,397 B1
(45) Date of Patent: Apr. 30, 2002

(54) DIFFERENTIAL GEARING DEVICE

(75) Inventor: Tai-Yang Luh, Tai Pen (TW)

(73) Assignee: Jenn Jianq Co., Ltd., Taichung Hsien (TW)

( * ) Notice: Subject to any disclaimer, the term of this patent is extended or adjusted under 35 U.S.C. 154(b) by 0 days.

(21) Appl. No.: 09/696,046

(22) Filed: Oct. 25, 2000

(51) Int. Cl.$^7$ .............................................. F16H 48/12
(52) U.S. Cl. ........................ 74/650; 192/50; 192/48.92; 350/357
(58) Field of Search ........................ 74/650; 192/48.92, 192/50; 180/350, 357

(56) References Cited

U.S. PATENT DOCUMENTS

| | | | |
|---|---|---|---|
| 1,535,634 A | * | 4/1925 | Starr |
| 1,930,454 A | * | 10/1933 | Law |
| 2,222,695 A | * | 11/1940 | Velo |
| 2,778,467 A | * | 1/1957 | Lewis |
| 3,232,369 A | * | 2/1966 | Holloway |
| 4,720,001 A | * | 1/1988 | Jensen ...................... 192/13 R |
| 5,036,939 A | * | 8/1991 | Johnson et al. ............. 180/233 |
| 5,103,690 A | * | 4/1992 | Macpherson et al. .. 74/655 GB |

* cited by examiner

*Primary Examiner*—Dirk Wright
(74) *Attorney, Agent, or Firm*—Alan Kamrath; Rider, Bennett, Egan & Arundel, LLP (57) ABSTRACT

A vehicle has a transmission shaft having an annular flange, a threaded end, a recess, and a cotter key inserted in the recess. A differential gearing device receives the transmission shaft. The differential gearing device has a bearing cover, a first one-way thrust bearing, a hollow bearing block, a second one-way thrust bearing, and a positioning disk. The hollow bearing block has a plate having four through holes. The first one-way thrust bearing and the second one-way thrust bearing are disposed in the hollow bearing block. Two screws fasten the bearing cover and the hollow bearing block together. A plurality of bolts fasten the plate and a driven element together. The transmission shaft passes through the bearing cover, the first one-way thrust bearing, the hollow bearing block, the second one-way thrust bearing, the positioning disk, and the driven element.

3 Claims, 9 Drawing Sheets

DIFFERENTIAL GEARING DEVICE

BACKGROUND OF THE INVENTION

The present invention relates to a differential gearing device. More particularly, the present invention relates to a differential gearing device which does not need any bevel gear.

A conventional differential gearing device has a plurality of bevel gears. It is cumbersome to assemble bevel gears With many accessory parts.

SUMMARY OF THE INVENTION

An object of the present invention is to provide a differential gearing device which has a plurality of one-way thrust bearings to perform differential gearing function.

Accordingly, a vehicle has a transmission shaft having an annular flange, a threaded end, a recess, and a cotter key inserted in the recess. A differential gearing device receives the transmission shaft. The differential gearing device comprises a beating cover, a first one-way thrust bearing, a hollow bearing block, a second one-way thrust bearing, and a positioning disk. The bearing cover has two through apertures, The first one-way thrust bearing has two first outer grooves. A first pin key is inserted in One of the first outer grooves of the first one-way thrust bearing. The hollow bearing block has a plate having four through holes, two inner grooves, and two threaded apertures. The second one-way thrust bearing has two second outer grooves. A second pin key is inserted in one of the second outer grooves of the second one-way thrust bearing. The first one-way thrust bearing and the second one-way thrust bearing are disposed in the hollow bearing block. The positioning disk has an inner thread. Two screws fasten the bearing cover and the hollow bearing block together. A plurality of bolts fasten the plate and a driven element together. The transmission shaft passes through the bearing cover, the first one-way thrust bearing, the hollow bearing block, the second one-way thrust bearing, the positioning disk, and the driven element. A nut engages with the threaded end of the transmission shaft. The first one-way thrust bearing is blocked by the annular flange of the transmission shaft.

DETAILED DESCRIPTION OF THE INVENTION

Referring to FIGS. 1 to 4A, a vehicle 10 has a transmission shaft 11 having an annular flange 12, a threaded end 14, a recess 13, and a cotter key 32b inserted in the recess 13. A differential gearing device receives the transmission shaft 11.

The differential gearing device comprises a bearing cover 20, a first one-way thrust bearing 30, a hollow bearing block 40, a second one-way thrust bearing 30a, and a positioning disk 50.

Figure 1:
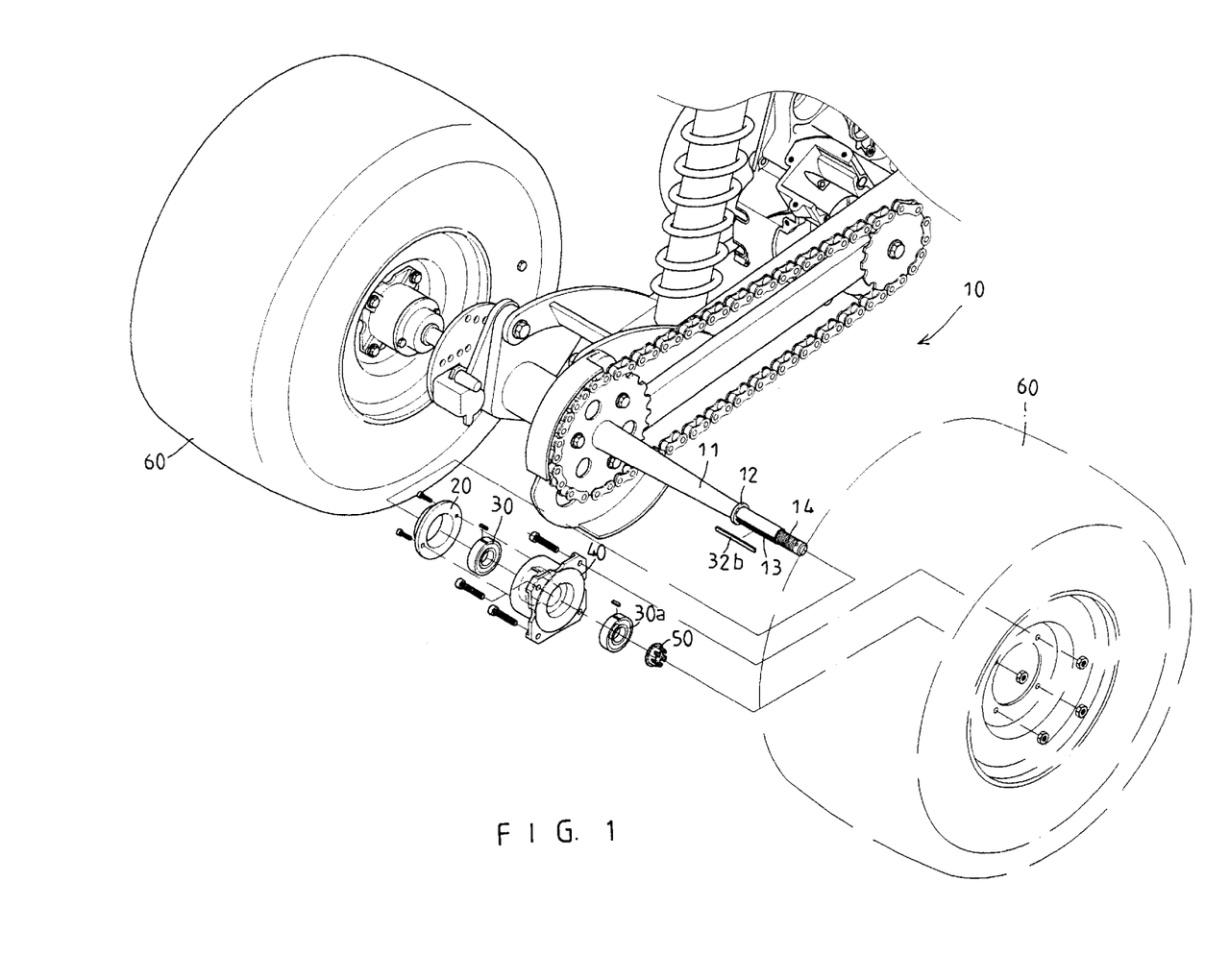
FIG. 1 is a perspective exploded view of a differential gearing device disposed in a vehicle of a preferred embodiment in accordance with the present invention.
Figure 1A:
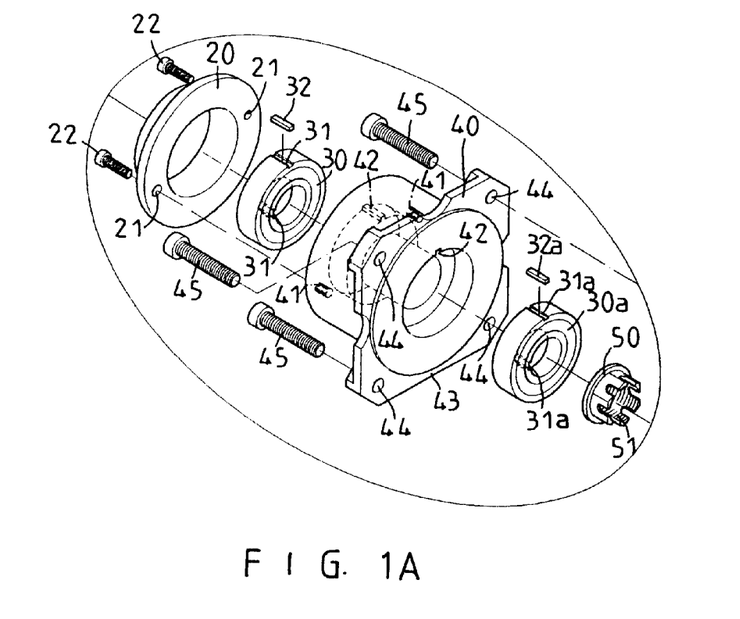
FIG. 1A is a perspective exploded view of a differential gearing device of a preferred embodiment in accordance with the present invention.
Figure 2:
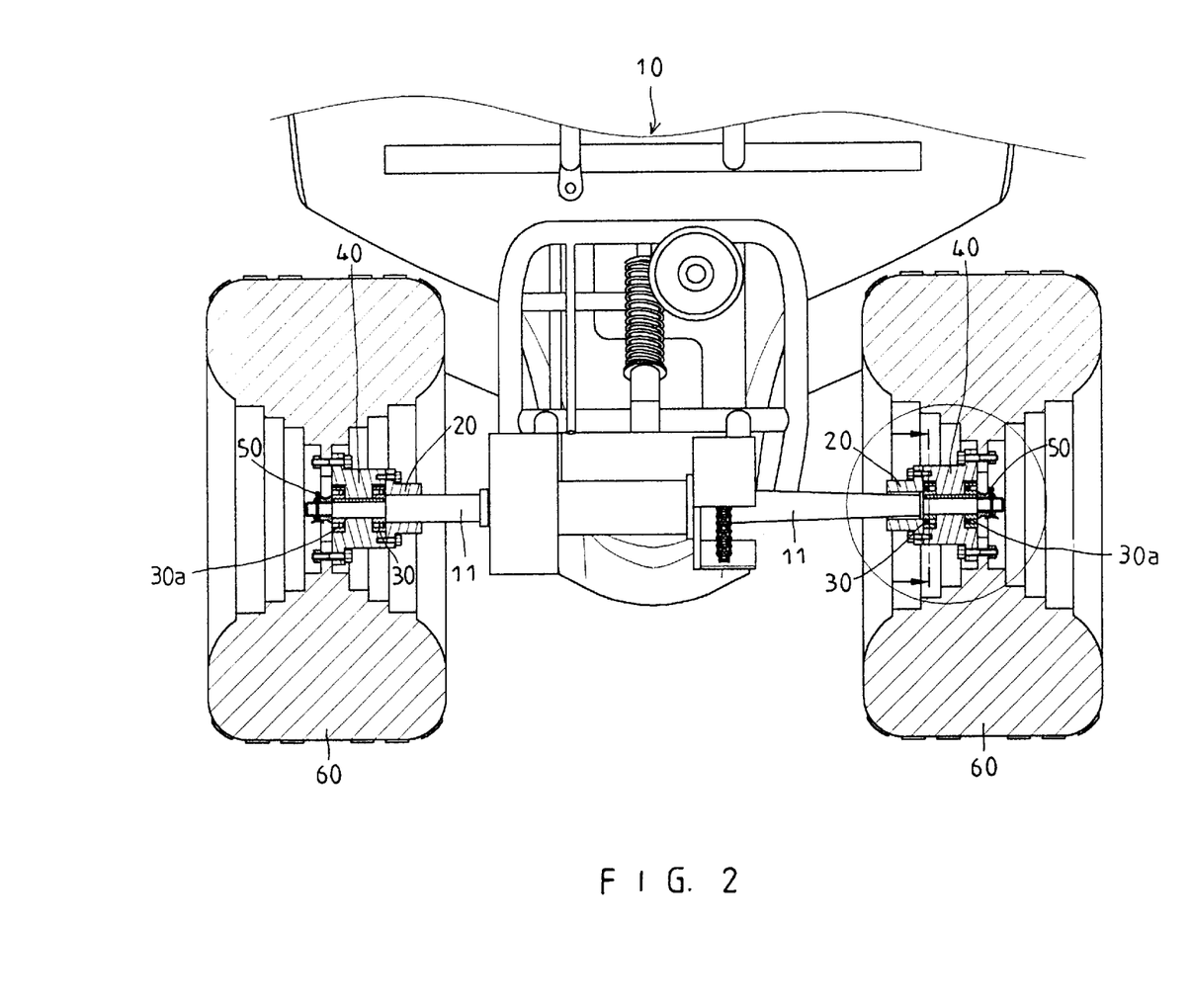
FIG. 2 is a sectional assembly view of two differential gearing devices disposed in a vehicle of a preferred embodiment in accordance with the present invention.
Figure 2A:
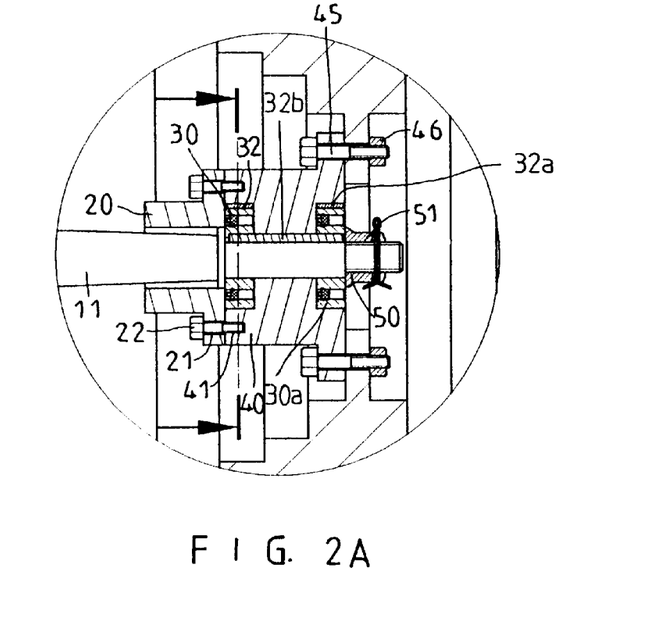
FIG. 2A is a sectional assembly view of a differential gearing device of a preferred embodiment in accordance with the present invention.

The bearing cover 20 has two through apertures 21.

The first one-way thrust bearing 30 has two first outer grooves 31. A first pin key 32 is inserted in one of the first outer grooves 31 of the first one-way thrust bearing 30.

The hollow bearing block 40 has a plate 43 having four through holes 44, two inner grooves 42, and two threaded apertures 41.

The second one-way thrust bearing 30a has two second outer grooves 31a. A second pin key 32a is inserted in one of the second outer grooves 31a of the second one-way thrust bearing 30a.

The first one-way thrust bearing 30 and the second one-way thrust bearing 30a are disposed in the hollow bearing block 40.

The positioning disk 50 has an inner thread 51.

Two screws 22 fasten the bearing covet 20 and the hollow bearing block 40 together.

A plurality of bolts 45 fasten the plate 43 and a driven element 60 together.

The transmission shaft 11 passes through the bearing cover 20, the first one-way thrust bearing 30, the hollow bearing block 40, the second one-way thrust bearing 30a, the positioning disk 50, and the driven element 60.

A nut 46 engages with the threaded end 14 of the transmission shaft 11.

The first one-way thrust bearing 30 is blocked by the annular flange 12 of the transmission shaft 11.

Figure 4:
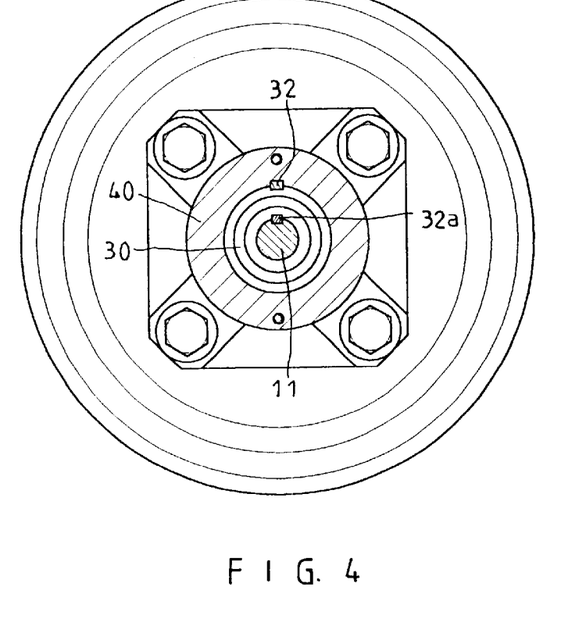
FIG. 4 is a schematic view illustrating an operation of a differential gearing device of a preferred embodiment in accordance with the present invention.
Figure 4A:
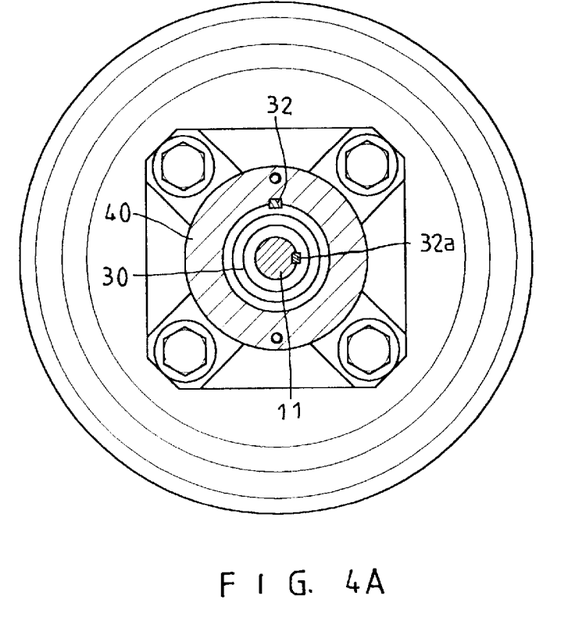
FIG. 4A is a schematic view illustrating another operation of a differential gearing device of a preferred embodiment in accordance with the present invention.

The rotation of the first one-way thrust bearing 30 and the rotation of the driven element 60 are in opposite directions.

Figure 3:
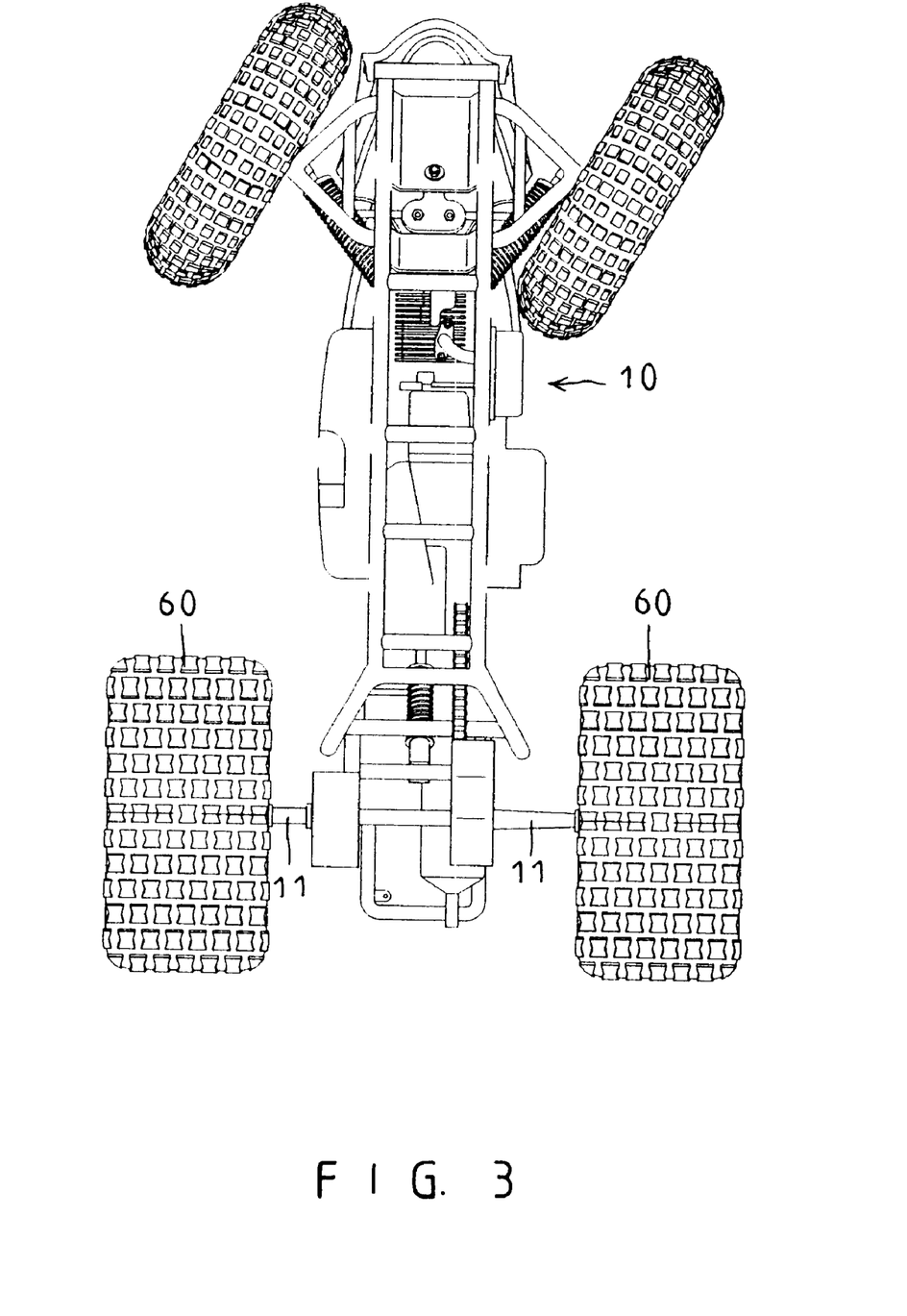
FIG. 3 is a schematic view illustrating a vehicle turning right.
Figure 3A:
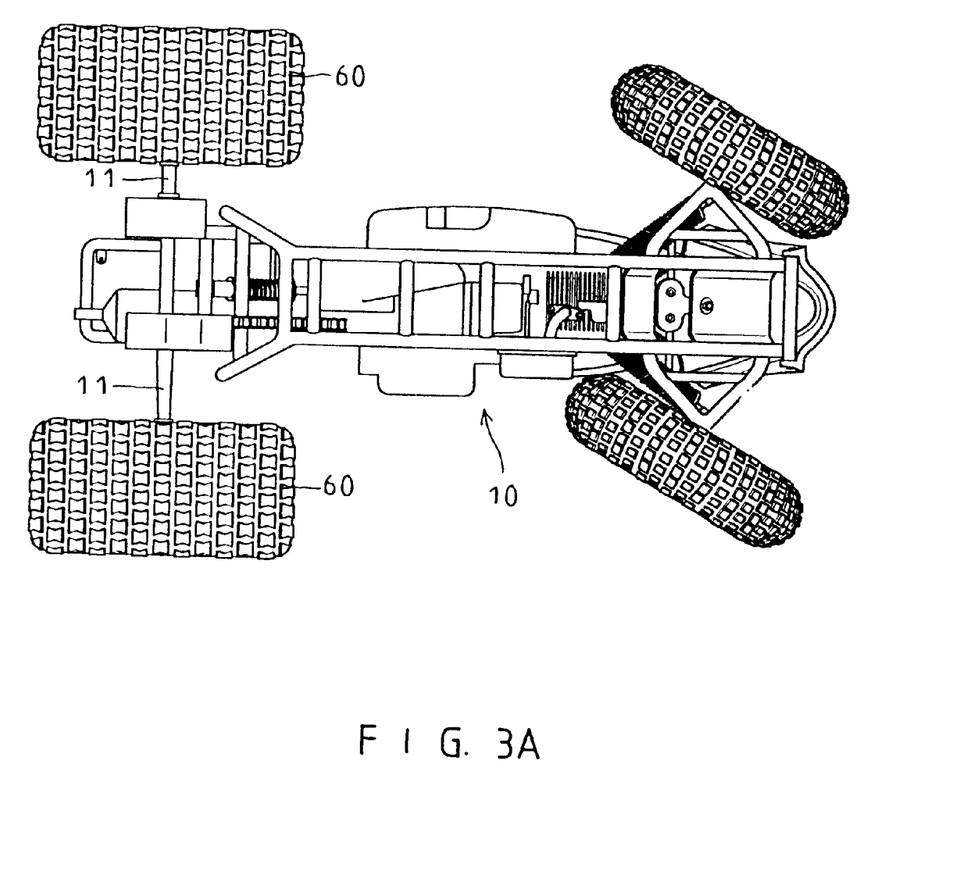
FIG. 3A is another schematic view illustrating a vehicle turning right.

Referring to FIGS. 3 and 3A, the driven element 60 is a wheel.

Figure 5:
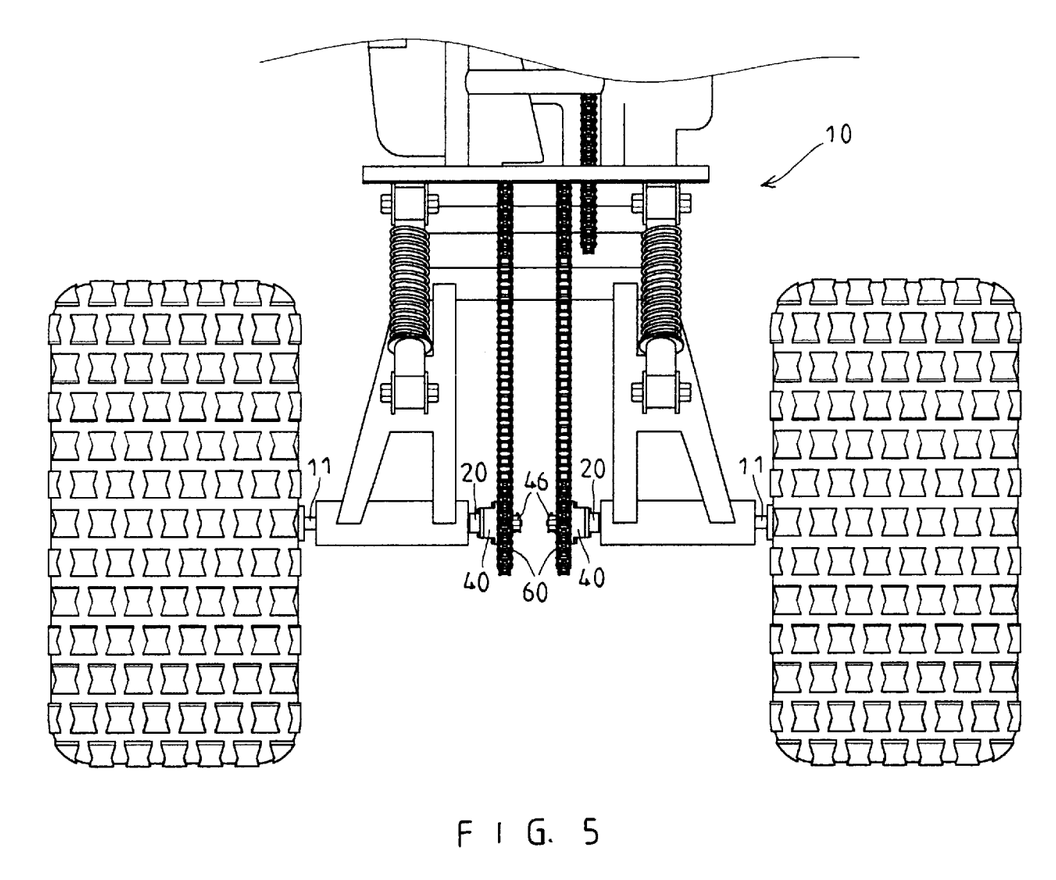
FIG. 5 is a schematic view illustrating two drive gears engaging with two differential gearing devices of a preferred embodiment in accordance with the present invention.

Referring to FIG. 5, the driven element 60 is a drive gear.

Figure 6:
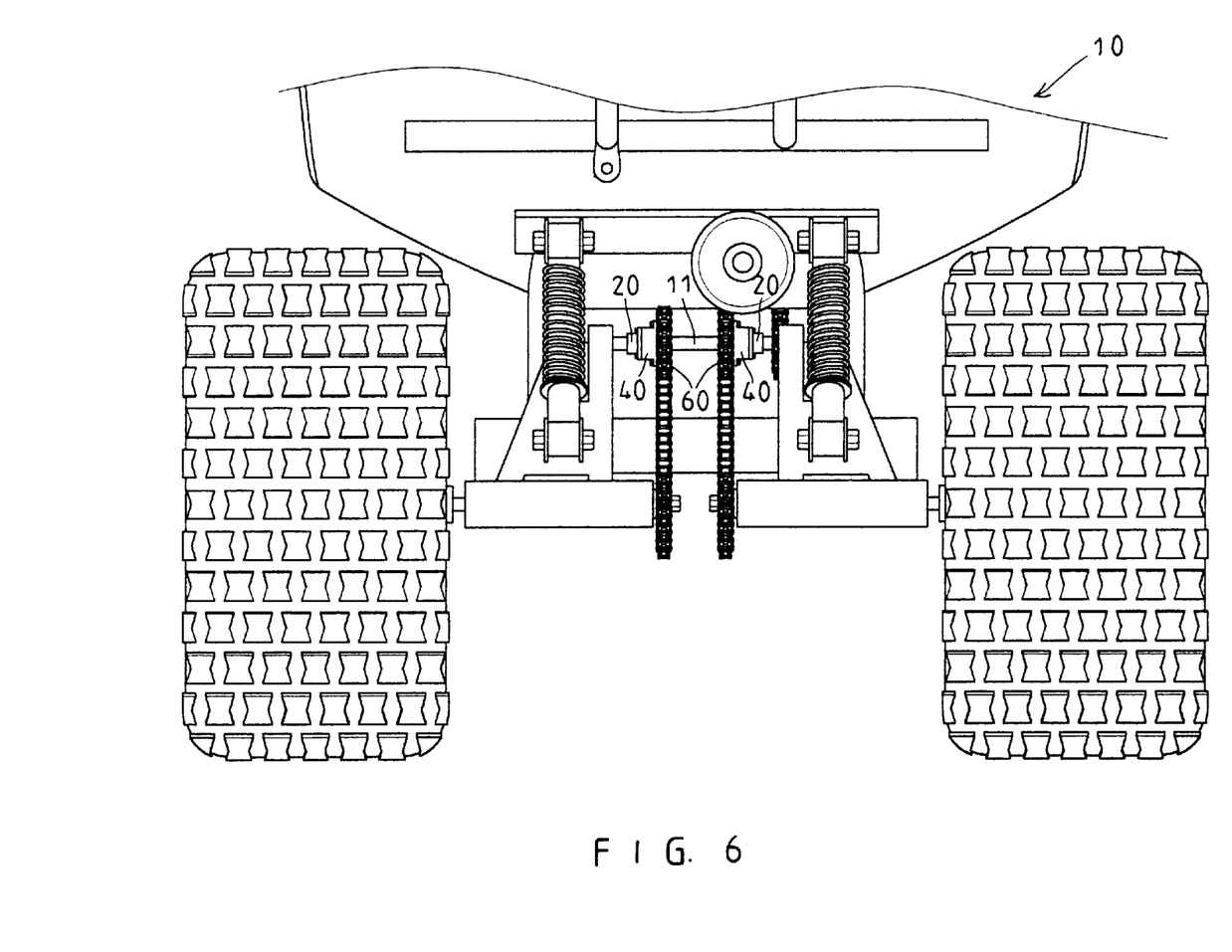
FIG. 6 is a schematic view illustrating two drive pinions engaging with two differential gearing devices of a preferred embodiment in accordance with the present invention.

Referring to FIG. 6, the driven element 60 is a drive pinion.

Figure 7:
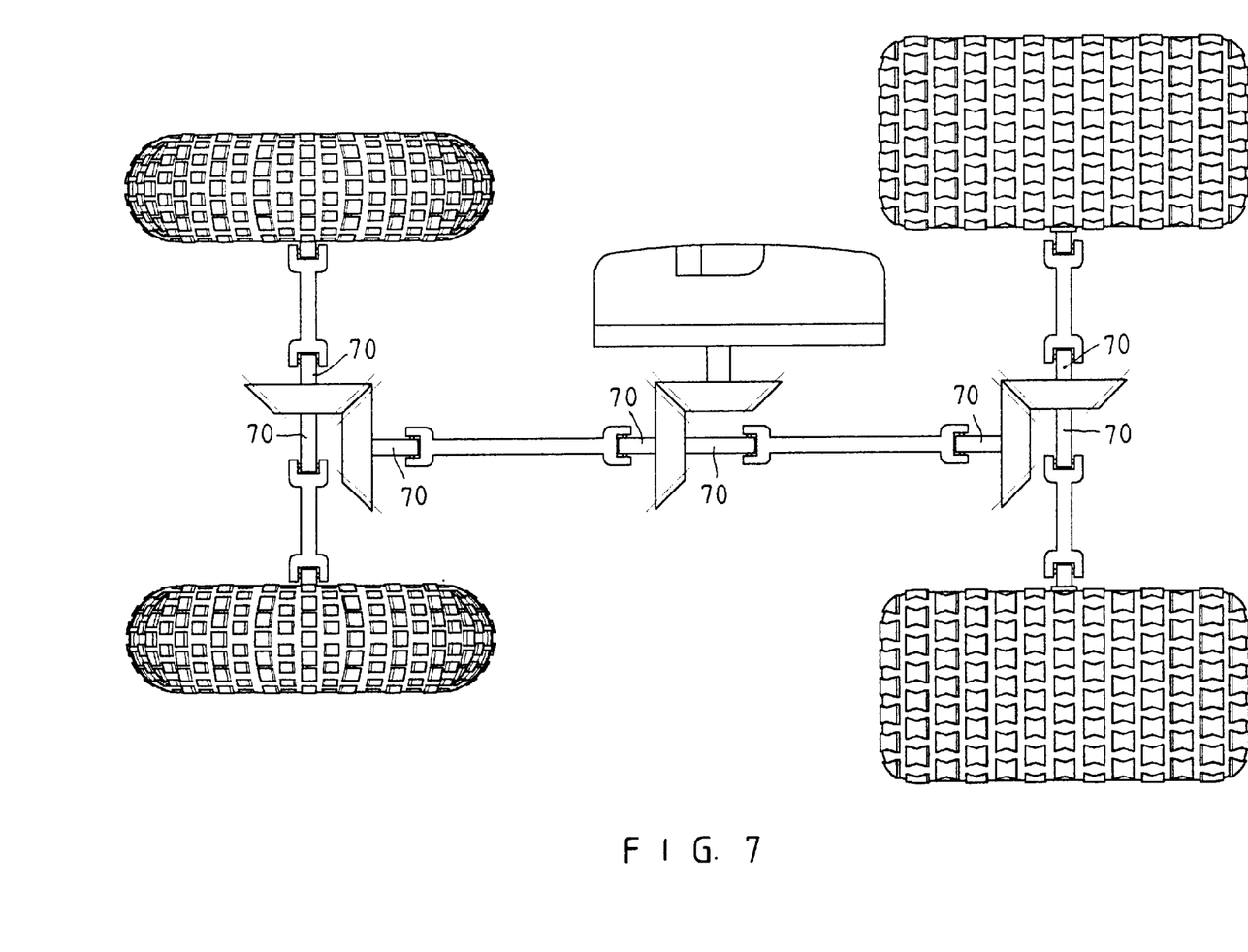
FIG. 7 is a schematic view illustrating plurality of differential gearing devices disposed on a plurality of transmission shafts of a four-wheel driving vehicle.

Referring to FIG. 7, a plurality of differential gearing devices are disposed on a plurality of transmission shafts 70 of a four-wheel driving vehicle.

The present invention is not limited to the above embodiments but various modification thereof May be made. Furthermore, Various changes in form and detail may be made without departing from the scope of the present invention.

I claim:

1. A vehicle having a transmission shaft having an annular flange, a threaded end, a recess, and a cotter key inserted in the recess, and a differential gearing device receiving the transmission shaft, characterized in that:

the differential gearing device comprises a bearing cover, a first one-way thrust bearing, a hollow bearing block, a second one-way thrust bearing, and a positioning disk, the bearing cover has two through apertures, the first one-way thrust bearing has two first outer grooves, a first pin key is inserted in one of the first outer grooves of the first one-way thrust bearing, the hollow bearing block has a plate having four through holes, two inner grooves, and two threaded apertures, the second one-way thrust bearing has two second outer grooves, a second pin key is inserted in one of the second outer grooves of the second one-way thrust bearing, the first one-way thrust bearing and the second one-way thrust bearing are disposed in the hollow bearing block, the positioning disk has an inner thread, two screws fasten the bearing cover and the hollow bearing block together, a plurality of bolts fasten the plate and a driven element together, the transmission shaft passes through the bearing cover, the first one-way thrust bearing, the hollow bearing block, the second one-way thrust bearing, the positioning disk, and the driven element, a nut engages with the threaded end of the transmission shaft, and the first one-way thrust bearing is blocked by the annular flange of the transmission shift.

2. The differential gearing device as claimed in claim 1, wherein the driven element is a drive gear.

3. The differential gearing device as claimed in claim 1, wherein the driven element is a drive pinion.

* * * * *